(12) United States Patent
Saruwatari et al.

(10) Patent No.: US 10,483,524 B2
(45) Date of Patent: Nov. 19, 2019

(54) NONAQUEOUS ELECTROLYTE BATTERY AND BATTERY PACK

(71) Applicant: Kabushiki Kaisha Toshiba, Minato-ku (JP)

(72) Inventors: Hidesato Saruwatari, Kawasaki (JP); Masataka Shikota, Kashiwazaki (JP); Dai Yamamoto, Kashiwazaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 70 days.

(21) Appl. No.: 15/261,031

(22) Filed: Sep. 9, 2016

(65) Prior Publication Data

US 2016/0380257 A1 Dec. 29, 2016

Related U.S. Application Data

(63) Continuation of application No. PCT/JP2015/055631, filed on Feb. 26, 2015.

(30) Foreign Application Priority Data

Mar. 10, 2014 (JP) ................................. 2014-046920

(51) Int. Cl.
| | |
|---|---|
| *H01M 4/131* | (2010.01) |
| *H01M 4/485* | (2010.01) |
| *H01M 2/16* | (2006.01) |
| *H01M 2/10* | (2006.01) |
| *H01M 2/14* | (2006.01) |

(Continued)

(52) U.S. Cl.
CPC ......... *H01M 4/131* (2013.01); *H01M 2/1077* (2013.01); *H01M 2/145* (2013.01);
(Continued)

(58) Field of Classification Search
CPC ........... H01M 10/0587; H01M 10/425; H01M 2200/10; H01M 2220/20; H01M 2/1077;
(Continued)

(56) References Cited

U.S. PATENT DOCUMENTS 7,629,081 B2 * 12/2009 Inagaki ................. H01M 4/131
429/231.1
8,728,670 B2 5/2014 Inagaki et al.
(Continued)

FOREIGN PATENT DOCUMENTS

| CN | 101399370 A | 4/2009 |
|---|---|---|
| EP | 2 665 110 A1 | 11/2011 |

(Continued)

OTHER PUBLICATIONS

International Search Report dated Apr. 7, 2015 in PCT/JP2015/055631, filed on Feb. 26, 2015 ( with English Translation).
(Continued)

*Primary Examiner* — Carlos Barcena
(74) *Attorney, Agent, or Firm* — Oblon, McClelland, Maier & Neustadt, L.L.P.

(57) ABSTRACT

According to an embodiment, there is provided a nonaqueous electrolyte battery. The nonaqueous electrolyte battery includes a positive electrode, a negative electrode, a separator sandwiched between the positive electrode and the negative electrode, and a nonaqueous electrolyte. The negative electrode contains a negative electrode active material having a Li-absorbing potential of 1 V vs. Li/Li$^+$ or more. An electrical resistance of the negative electrode in a discharged state is within a range of 100 Ω·cm to 100000 Ω·cm. A pore volume ratio of pores having a pore diameter of 1 μm or more in the separator is more than 70%. The pore volume ratio is determined from a cumulative pore volume frequency curve of the separator obtained by a mercury intrusion porosimetry.

7 Claims, 6 Drawing Sheets

(51) Int. Cl.
*H01M 2/34* (2006.01)
*H01M 10/0525* (2010.01)
*H01M 10/0587* (2010.01)
*H01M 10/42* (2006.01)
*H01M 4/02* (2006.01)

(52) U.S. Cl.
CPC ........... *H01M 2/16* (2013.01); *H01M 2/1673* (2013.01); *H01M 2/348* (2013.01); *H01M 4/485* (2013.01); *H01M 10/0525* (2013.01); *H01M 2/1626* (2013.01); *H01M 10/0587* (2013.01); *H01M 10/425* (2013.01); *H01M 2004/021* (2013.01); *H01M 2004/027* (2013.01); *H01M 2220/20* (2013.01); *Y02T 10/7011* (2013.01)

(58) Field of Classification Search
CPC ...... H01M 2/1094; H01M 2/14; H01M 2/145; H01M 2/1673; H01M 2/348; H01M 4/131; H01M 4/485
See application file for complete search history.

(56) References Cited

U.S. PATENT DOCUMENTS

| | | |
|---|---|---|
| 2008/0176142 A1 | 7/2008 | Inagaki et al. |
| 2009/0081534 A1 | 3/2009 | Takami et al. |
| 2012/0214044 A1 | 8/2012 | Takami et al. |
| 2012/0244412 A1 | 9/2012 | Pascaly et al. |
| 2013/0089780 A1 | 4/2013 | Uezono |
| 2013/0295441 A1 | 11/2013 | Yoshikawa et al. |
| 2014/0178767 A1 | 6/2014 | Takami et al. |

FOREIGN PATENT DOCUMENTS

| | | |
|---|---|---|
| JP | 2008-41402 | 2/2008 |
| JP | 2009-54319 | 3/2009 |
| JP | 2009-81048 | 4/2009 |
| JP | 2009-141181 | 6/2009 |
| JP | 2011-54503 | 3/2011 |
| JP | 2013-84397 | 5/2013 |
| JP | 2014-17209 | 1/2014 |

OTHER PUBLICATIONS

Written opinion dated Apr. 7, 2015 in PCT/JP2015/055631, filed on Feb. 26, 2015.
Extended European Search Report dated Jul. 4, 2017 in European Patent Application No. 15761109.6.

* cited by examiner

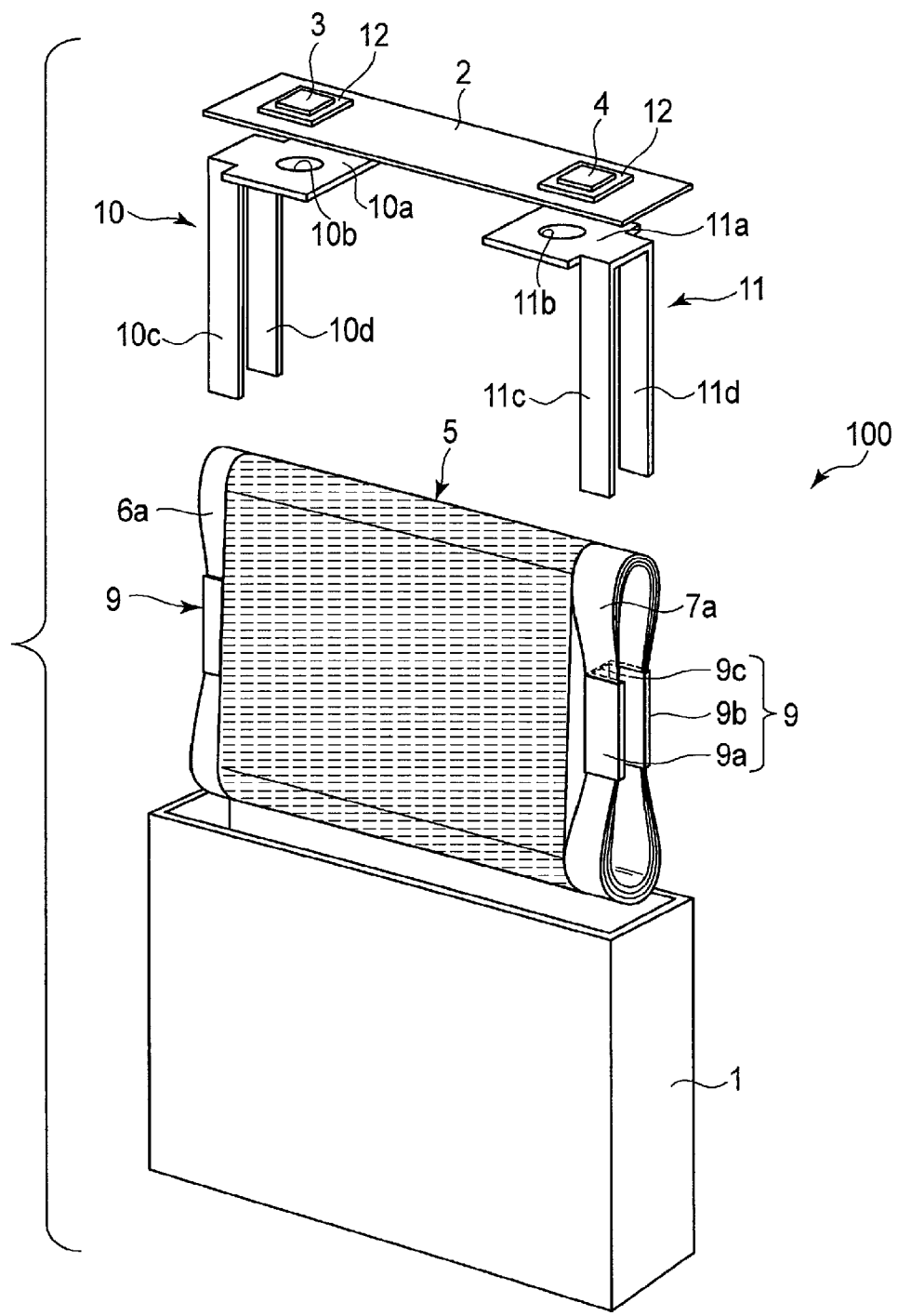
F I G. 1 ably changed taking the following descriptions and
NONAQUEOUS ELECTROLYTE BATTERY AND BATTERY PACK

CROSS-REFERENCE TO RELATED APPLICATIONS

This application is a Continuation application of PCT Application No. PCT/JP2015/055631, filed Feb. 26, 2015 and based upon and claiming the benefit of priority from the Japanese Patent Application No. 2014-046920, filed Mar. 10, 2014, the entire contents of all of which are incorporated herein by reference.

FIELD

Embodiments of the present invention relate to a nonaqueous electrolyte battery and a battery pack.

BACKGROUND

Using a separator with a high ratio of pores having a pore diameter of 1 μm or more per unit volume is advantageous for long-term stabilization of a battery and improving impregnation with an electrolyte solution. However, using such a separator has a problem that a positive electrode and a negative electrode will probably come into contact, resulting in a cell with a large self-discharge amount.

BRIEF DESCRIPTION OF DRAWINGS

FIG. 1 is an exploded perspective view of an example of nonaqueous electrolyte battery according to the first embodiment.

DETAILED DESCRIPTION

Figure 2:
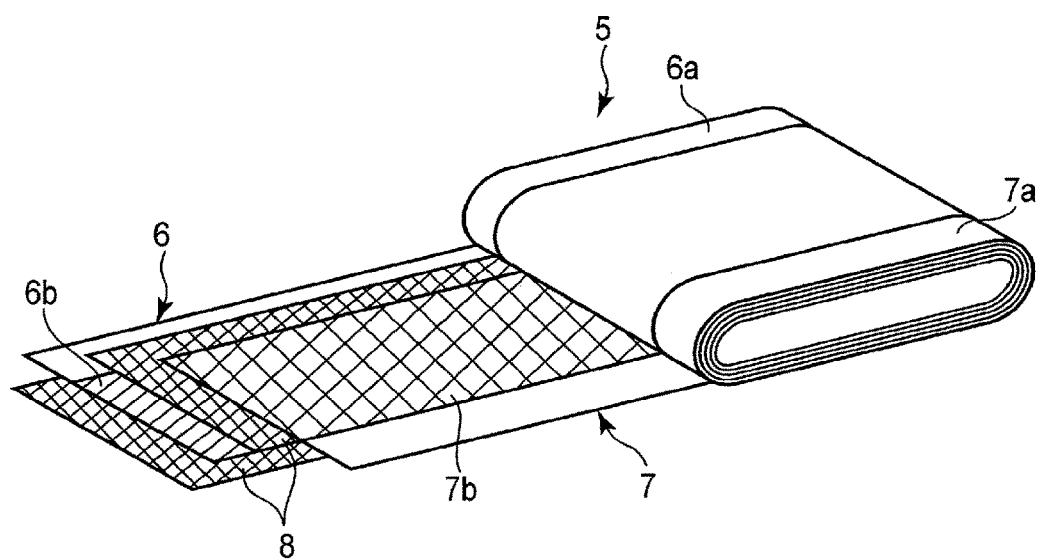
FIG. 2 is a partially developed perspective view of an electrode group included in the nonaqueous electrolyte battery shown in FIG. 1.

In general, according to a first embodiment, there is provided a nonaqueous electrolyte battery. The nonaqueous electrolyte battery includes a positive electrode, a negative electrode, a separator sandwiched between the positive electrode and the negative electrode, and a nonaqueous electrolyte. The negative electrode contains a negative electrode active material having a Li-absorbing potential of 1 V vs. Li/Li$^+$ or more. An electrical resistance of the negative electrode in a discharged state is within a range of 100 Ω·cm to 100000 Ω·cm. A pore volume ratio of pores having a pore diameter of 1 μm or more in the separator is more than 70%. The pore volume ratio is determined from a cumulative pore volume frequency curve of the separator obtained by a mercury intrusion porosimetry.

Description of Embodiments

Hereinafter, the embodiments will be described with reference to the drawings. The same reference numerals denote common portions throughout the embodiments and overlapping descriptions are not repeated. Each of these drawings is a typical view to aid the descriptions and promote an understanding of the embodiment. Although there are parts different from those of actual devices in shape, dimension and ratio, these structural designs may be properly changed taking the following descriptions and known technologies into consideration.

(First Embodiment)

According to a first embodiment, there is provided a nonaqueous electrolyte battery. The nonaqueous electrolyte battery includes a positive electrode, a negative electrode, a separator sandwiched between the positive electrode and the negative electrode, and a nonaqueous electrolyte. The negative electrode contains a negative electrode active material having a Li-absorbing potential of 1 V vs. Li/Li$^+$ or more. An electrical resistance of the negative electrode in a discharged state is within a range of 100 Ω·cm to 100000 Ω·cm. A pore volume ratio of pores having a pore diameter of 1 μm or more in the separator is more than 70%. The pore volume ratio is determined from a cumulative pore volume frequency curve of the separator obtained by a mercury intrusion porosimetry.

The inventors found that using a negative electrode active material having a Li-absorbing potential of 1 V vs. Li/Li$^+$ or more as a negative electrode active material for a nonaqueous electrolyte battery, and using a separator where pores having a pore diameter of 1 μm or more occupy the majority of a pore volume ratio, as well as making the electrical resistance of the negative electrode in a discharge state within a range of 100 Ω·cm to 100000 Ω·cm, a battery being excellent in life characteristics and having a small self-discharging amount can be realized.

Here, the separator where pores having a pore diameter of 1 μm or more occupy the majority of a pore volume ratio specifically means a separator where pores having a pore diameter of 1 μm or more occupy more than 70% of the whole pore volume. In such a separator, a pore volume ratio of pores having a pore diameter of 1 μm or more is more than 70%. The pore volume ratio is calculated from a cumulative pore volume frequency curve obtained from a pore diameter distribution measurement of the separator with a mercury intrusion porosimetry.

If a nonaqueous electrolyte battery is subjected to charging and discharge repeatedly, by-products caused by side reactions of a battery reaction may accumulate in pores of separator, and as a result, clogging of separator may occur. When clogging occurs in the separator, a battery resistance may be increased. However, a separator where a pore volume ratio of pores having a pore diameter of 1 μm or more is more than 70% can inhibit such separator clogging, and can suppress an increase in battery resistance.

When a negative electrode comes into contact with a positive electrode via a through-hole part, the contact part rapidly becomes a discharge state. Since the electrical resistance of the negative electrode included in the nonaqueous electrolyte according to the first embodiment in a discharge state is within a range of 100 Ω·cm to 100000 Ω·cm, the part entering a discharged state in the negative electrode can act as an insulator. Due to the part entering the discharged state in the negative electrode, self-discharge caused by contact with a positive electrode almost never progress and stops. That is, the part that has entered the discharged state in the negative electrode can prevent further progress of self-discharge in the nonaqueous electrolyte battery.

Moreover, by using a negative electrode active material with a Li-absorbing potential of 1 V vs. Li/Li$^+$ or more as a negative electrode active material for a nonaqueous electrolyte battery, precipitation of lithium dendrites due to the charge-and-discharge cycle can be suppressed. As a result, risks such as short circuit, self-discharge, and ignition caused by precipitation of lithium dendrites can be avoided.

Due to these effects, the nonaqueous electrolyte battery according to the first embodiment can exhibit excellent life property, and can suppress self-discharge.

When a pore volume ratio of pores having a pore diameter of 1 μm or more is smaller than 70% in the separator, clogging of the separator often occurs. As the result, an electrical resistivity of the battery may be increased. The pore volume ratio of the pores having a pore diameter of 1 μm or more in the separator is preferably not more than 99%.

A mode diameter of the separator is preferably within a range of 1 μm to 20 μm. A mode diameter of the separator is the pore diameter with the largest pore volume in a pore diameter distribution curve of the separator as determined by the mercury intrusion porosimetry, that is, the most frequent pore diameter. A separator with a mode diameter within the range of 1 μm to 20 μm can further suppress an increase in electrical resistivity caused by clogging of the separator and self-discharge.

A thickness of the separator is preferably within a range of 3 μm to 25 μm. The separator having a thickness within the range of 3 μm to 25 μm can further suppress increase in electrical resistivity caused by clogging of the separator and self-discharge.

If an electrical resistivity of a negative electrode in discharged state is not larger than 100 Ω·cm, a self-discharge reaction which occurs when a negative electrode comes into contact with a positive electrode via a through-hole part may progress until the whole battery enters a discharged state. In contrast, if an electrical resistivity of a negative electrode in a discharged state is not larger than 100000 Ω·cm, the electrical resistivity of the negative electrode is too large, and an output characteristic of the battery is reduced. A more preferable range of an electrical resistivity of a negative electrode in a discharged state is 200 Ω·cm to 10000 Ω·cm.

If a negative electrode active material having a Li-absorbing potential of less than 1 V vs. Li/Li$^+$ is used as a negative electrode active material for a nonaqueous electrolyte battery, precipitation of lithium dendrite on a surface of the negative electrode due to charging-and-discharge cycle may occur. Lithium dendrites may cause short circuits, self-discharge, and ignition of the nonaqueous electrolyte battery.

Pores of a separator may be regulated by combining various factors. For example, pores of a separator may be regulated by devising and combining conditions such as a mixing ratio of raw materials of a different fiber diameter (μm), fiber length (μm), material, and shape, weighing (g/m$^2$), and thickness (μm), density (g/cm$^3$), and manufacturing method of a separator.

An electrical resistivity of a negative electrode in a discharged state may be regulated by combining various factors. For example, an electrical resistivity of a negative electrode in a discharged state may be regulated by combining an electrical resistivity of a negative electrode active material itself, an electrical resistivity of a conductive agent to be mixed with the negative electrode active material, and their mixing ratio in the negative electrode.

For example, an example of a mixed negative electrode where a spinel-type lithium-titanium composite oxide, $Li_{4+x}Ti_5O_{12}$ (x varies within −1≤x≤3 according to charge-and-discharge reaction), as a negative electrode active material, and graphite as a conductive agent, are used, will be explained. The spinel-type lithium-titanium composite oxide in a discharged state is an insulator. Here, a specific surface area of the spinel-type lithium-titanium composite oxide is represented by A (m$^2$/g), a weight content ratio of the spinel-type lithium-titanium composite oxide in the electrode is represented by B, a specific surface area of the graphite is represented by C (m$^2$/g), and a weight content ratio of the graphite in the electrode is represented by D. In such a negative electrode, if the value of AB/CD is made to be within a range of 4 to 25, the electrical resistivity of the negative electrode in a discharged state may be within the range of 100 Ω·cm to 100000 Ω·cm. However, the electrical resistivity may be varied depending on a negative electrode density and dispersion states of the active material and the conductive agent.

A pore diameter distribution of a separator with a mercury intrusion porosimetry may be determined as follows:

First, a nonaqueous electrolyte battery is disassembled, for example, in an inert atmosphere such as argon. Next, the electrode group is taken out from the disassembled nonaqueous electrolyte battery. From the taken-out electrode group, a separator is taken out by using a tool such as tweezers. The taken-out separator is washed with methyl ethyl carbonate, and Li salts in the separator are removed. After washing, the separator is dried to obtain a measurement sample.

Then, the measurement sample is loaded in a measuring analyzer. The measuring analyzer includes for example, a pore diameter distribution measuring analyzer Autopore 9520 (made by Shimadzu Corporation). In a measurement using this analyzer, the measurement sample is cut into a width of approximately 25 mm, and folded up, and put into the analyzer, make it possible to measure a pore diameter distribution.

From the thus obtained pore diameter distribution data of the separator, the cumulative pore volume frequency curve and the pore diameter distribution curve can be obtained.

From the thus obtained cumulative pore volume frequency curve, the pore volume ratio of pores having a pore diameter of 1 μm or more of the measured separator can be determined.

Moreover, from the thus obtained diameter distribution curve, the mode diameter of the measured separator can be determined.

Next, a measuring method of an electrical resistivity of a negative electrode in a discharged state will be explained.

First, a battery is connected to an appropriate resistor, and discharged until the battery voltage (open-circuit voltage) reaches 1 V at room temperature. Next, the thus discharged battery is disassembled as described above. Next, the electrode group is taken out from the disassembled battery, and from the taken-out electrode group, a negative electrode is taken out. Then, the taken-out electrode is washed with methyl ethyl carbonate, and Li salts in the electrode are removed. After washing, the electrode is dried, and this electrode is held between two leads having a predetermined area, pressed with a predetermined pressure, for example, 50 kgf/cm$^2$. Then, each of the leads connected to either the front side of the electrode or the back side of the electrode is connected to a Wheatstone bridge, and the electrical resistance of the negative electrode is measured.

When the electrical resistance read out from the Wheatstone bridge is treated as R (Ω), measured part area of the electrode is treated as S (cm$^2$), and thickness of the electrode is treated as T (cm), the electrical resistivity (Ω·cm) is calculated from the following formula.

Electrical resistivity(Ω·cm)=$S(cm^2) \times R(\Omega)/T(cm)$

The thus calculated electrical resistivity is the electrical resistivity of the negative electrode in a discharged state.

A thickness of a separator can be measured as follows:

A separator having a length of 500 mm is folded 10 times so that the direction of the folding lines becomes perpendicular to the length direction of the separator, and the thickness is measured with an outside micrometer specified in JIS B7502 (spindle diameter, 6.35 mm; measurement length, not more than 25 mm). The obtained value is divided by 10, and the quotient is determined to be a separator thickness.

Now, the details of the nonaqueous electrolyte battery according to the first embodiment will be explained.

The nonaqueous electrolyte battery according to the first embodiment comprises a positive electrode, a negative electrode, a separator that is sandwiched between the positive electrode and the negative electrode, and a nonaqueous electrolyte.

The positive electrode can comprise a positive electrode current collector, and a positive electrode material layer (positive electrode active material-containing layer) supported by one surface or both surfaces of the positive electrode current collector.

The positive electrode material layer can contain a positive electrode active material. The positive electrode material layer can further contain a conductive agent and a binder, as necessary.

The positive electrode current collector can include a part having surfaces not supporting the positive electrode material layer. The part of the positive electrode current collector where the positive electrode material layer is not supported can act as a positive electrode tab. Alternatively, a positive electrode can include a positive electrode tab being different from a positive electrode current collector.

The negative electrode can include a negative electrode current collector, and a negative electrode material layer (negative electrode active material-containing layer) supported by one surface or both surfaces of the negative electrode current collector.

The negative electrode material layer can contain a negative electrode active material. A negative electrode active material having a Li-absorbing potential of 1 V vs. Li/Li$^+$ or more can be contained in the negative electrode material layer. The negative electrode material layer can further contain a conductive agent and a binder, as necessary.

The negative electrode current collector can include a part having surfaces not supporting the negative electrode material layer. The part of the negative electrode current collector where the negative electrode material layer is not supported can act as a negative electrode tab. Alternatively, a negative electrode can include a negative electrode tab being different from a negative electrode current collector.

The separator is sandwiched between the positive electrode and the negative electrode. Thus, the positive electrode and the negative electrode can oppose each other through the separator.

The positive electrode, the negative electrode, and the separator can constitute an electrode group. The electrode group can have various structures. For example, the electrode group may have a stack type structure. An electrode group in the stack type structure can be obtained by, for example, laminating a plurality of positive electrodes and a plurality of negative electrodes with the separators each of which is sandwiched between the positive electrode material layer and the negative electrode material layer. Alternatively, the electrode group may have a wound type structure. An electrode group in the wound type structure can be obtained by laminating, for example, one separator, one positive electrode, another separator, and one negative electrode in this order to produce a laminate, and then winding the laminate such that the negative electrode is on the outer side.

Such an electrode group can be impregnated with the nonaqueous electrolyte.

The nonaqueous electrolyte battery according to the first embodiment can further include a positive electrode terminal and a negative electrode terminal.

The positive electrode terminal can act as a conductor allowing electrons to move between the positive electrode and an external circuit by a portion thereof being electrically connected to a part of the positive electrode. The positive electrode terminal can be connected, for example, to the positive electrode current collector, especially to the positive electrode tab. Similarly, the negative electrode terminal can act as a conductor allowing electrons to move between the negative electrode and an external terminal by a portion thereof being electrically connected to a part of the negative electrode. The negative electrode terminal can be connected, for example, to the negative electrode current collector, especially to the negative electrode tab.

The nonaqueous electrolyte battery according to the first embodiment can further comprise a container member. The container member can accommodate the electrode group and the nonaqueous electrolyte. A part of each of the positive electrode terminal and the negative electrode terminal can be extended from the container member.

Hereinafter, the members of the nonaqueous electrolyte battery according to the first embodiment will be explained in detail.

1) Negative Electrode;

As the negative electrode current collector, for example, metal foils or alloy foils are used, and aluminum foils or aluminum alloy foils are especially preferable. Aluminum foils or aluminum alloy foils desirably have a mean crystalline particle size of not larger than 50 µm, more preferably not larger than 30 µm, further preferably not larger than 5 µm. By making a mean crystalline particle size of aluminum foils or aluminum alloy foils not larger than 50 µm, a strength of aluminum foils or aluminum alloy foils can be dramatically increased. Thus, when a pressing process, the high pressure can be applied to the negative electrode material layer to make the negative electrode material layer high density and to increase the negative electrode capacity. Furthermore, deterioration caused by dissolving and corrosion of the current collector in an over discharge cycle under high-temperature atmosphere (not lower than 40° C.) can be prevented, and an increase of negative electrode impedance can be suppressed. furthermore, output characteristics, a rapid charging property, and a charge-and-discharge cycle property may be improved.

The mean crystalline particle size is determined as follows: The surface texture of the current collector is observed with an optical microscope, and the number of crystalline particles existing in an area of 1 mm×1 mm, n, is determined. By using this number n, and from the formula of S=1×10$^6$/n (µm$^2$), the mean crystalline particle area, S, is determined. By using the obtained value of S, and from the following formula (A), the mean crystalline particle size, d (µm), is determined.

$$d=2(S/\Pi)^{1/2} \tag{A}$$

The mean crystalline particle size of an aluminum foil or aluminum alloy foil can vary according to a complicated influence from a plurality of factors, including material texture, impurities, processing conditions, heat treatment history, and annealing conditions. The mean crystalline particle size can be regulated by controlling the combination of the factors described above during manufacturing the current collector.

A thickness of the current collector is desirably not larger than 20 μm, more preferably not larger than 15 μm. Aluminum foils preferably have a purity not lower than 99% by mass. Aluminum alloys are preferably alloys containing elements such as magnesium, zinc, and silicon. The content of alloy component transition metals such as iron, copper, nickel, and chromium is preferably not larger than 1% by mass.

As explained above, the negative electrode active material contains negative electrode active materials having a Li-absorbing potential of 1 V vs. Li/Li$^+$ or more, that is, negative electrode active materials capable of performing charge-and-discharge reaction at the potential not lower than 1 V (preferably not lower than 1.1 V and not higher than 3 V) based on Li.

Now, a measuring method of reaction potential will be explained. First, a three-electrode cell where the negative electrode active material to be measured is used as the working electrode, metallic lithium is used as the counter electrode and the reference electrode is manufactured. In this three-electrode cell, an absorption-and-release reaction of lithium is performed at 1/10 the current value of the electric capacity of the working electrode, that is, at the 0.1 C rate. The mean working potential in the lithium extracting reaction on this occasion is determined to be the reaction potential of the negative electrode active material. Should be noted that a current value needed to discharge an electric capacity of an electrode within an hour is defined as the 1 C rate, and a ratio of actual current value to the 1 C rate is determined to be the rate of the current value.

Examples of negative electrode active material having a Li-absorbing potential of 1 V vs. Li/Li$^+$ or more include spinel-type lithium-titanium composite oxides. Examples of spinel-type lithium-titanium composite oxides include a composite oxide represented by $Li_{4+x}Ti_5O_{12}$ (x varies in charge-and-discharge reaction within $0 \leq x \leq 3$).

Other examples of negative electrode active materials having a Li-absorbing potential of 1 V vs. Li/Li$^+$ or more include lithium compounds that can absorb and release lithium. Examples of such lithium compounds include lithium oxides, lithium sulfides, and lithium nitrides. The examples also include metal compounds not containing lithium in an uncharged state, but containing lithium after charging.

Examples of oxides containing lithium after charging include, for example, titanium-containing metal composite oxides, amorphous tin oxides, for example, $SnB_{0.4}P_{0.6}O_{3.1}$, tin silicon oxides, for example, $SnSiO_3$, silicon oxides, for example, $SiO$, and tungsten oxides, for example, $WO_3$. Among them, titanium-containing metal composite oxides are preferable.

Examples of titanium-containing metal composite oxide include, for example, lithium-titanium oxides, and titanium-based oxides not containing lithium as synthesized. Examples of lithium-titanium oxides other than spinel-type lithium-titanium composite oxides include, for example, lithium titananes having ramsdellite-type structures. Examples of the lithium titananes having ramsdellite-type structures include lithium titananes represented by $Li_{2+y}Ti_3O_7$ (y varies in charge-and-discharge reaction within $-1 \leq y \leq 3$). Examples of titanium-based oxides include $TiO_2$, metal composite oxides containing Ti and at least one element selected from the group consisting of P, V, Sn, Cu, Ni, Nb and Fe. As $TiO_2$, anatase-type low-crystalline $TiO_2$ which has been subjected to heat treatment at a temperature ranging of 300° C. to 500° C. is preferable. Examples of metal composite oxides containing Ti and at least one element selected from the group consisting of P, V, Sn, Cu, Ni, Nb and Fe include, for example, $TiO_2$—$P_2O_5$, $TiO_2$—$V_2O_5$, $TiO_2$—$P_2O_5$—$SnO_2$, $TiO_2$—$P_2O_5$-MeO (Me is at least one element selected from the group consisting of Cu, Ni, and Fe), and $Nb_2TiO_7$. These metal composite oxides preferably have low-crystallinity, and a micro structure where a crystal phase and amorphous phase coexist or amorphous phase exists solely. Such microstructure can significantly improve the cycle property. Among them, lithium-titanium oxide, and metal composite oxides containing Ti and at least one element selected from the group consisting of P, V, Sn, Cu, Ni, Nb and Fe, are preferable.

Examples of sulfides include, for example, titanium sulfides such as $TiS_2$, molybdenum sulfides such as $MoS_2$, and iron sulfides such as $FeS$, $FeS_2$, $Li_xFeS_2$ ($0 \leq x \leq 2$).

Examples of nitrides include, for example, lithium-cobalt nitrides (for example, $Li_xCo_yN$, wherein $0<x<4$, and $0<y<0.5$).

One of these active materials may be used solely or two or more of these active materials can be used in combination.

Examples of conductive agents include, for example, carbon black, graphite, graphene, fullerene, coke, carbon fiber, and metal powder. Among them, carbon black, graphite, and graphene are preferable. Examples of carbon black include acetylene black, Ketjen black, and furnace black.

Examples of binder include, for example, polytetrafluoroethylene (PTFE), polyvinylidene fluoride (PVdF), acryl resin, polyolefin resin, polyurethane resin, polyimide resin, fluorine-based rubber, and styrene-butadiene rubber.

A negative electrode may be prepared, for example, by adding a conductive agent and a binder to a powdery negative electrode active material, suspending them in an appropriate solvent, coating a current collector with these suspended solids (slurry), and drying and pressing the coated film, resulting in a band-like electrode.

In this case, blending ratios of the negative electrode active material, the conductive agent, and the binder are preferably 73% by weight to 98% by weight, 0% by weight to 20% by weight, and 2% by weight to 7% by weight, respectively.

2) Positive Electrode;

Examples of positive electrode active material include various oxides and sulfides, for example, manganese dioxide ($MnO_2$), iron oxide, copper oxide, nickel oxide, lithium-manganese composite oxide (for example, $Li_xMn_2O_4$ or $Li_xMnO_2$), lithium-nickel composite oxide (for example, $Li_xNiO_2$), lithium-cobalt composite oxide ($Li_xCoO_2$), lithium-nickel-cobalt composite oxide (for example, Li—$Ni_{1-y-z}Co_yM_zO_2$ (M is at least one element selected from the group consisting of Al, Cr, and Fe, and $0 \leq y \leq 0.5$, and $0 \leq z \leq 0.1$)), lithium-manganese-cobalt composite oxide (for example, $Li_xMn_{1-y-z}Co_yM_zO_2$ (M is at least one element selected from the group consisting of Al, Cr, and Fe, and $0 \leq y \leq 0.5$, $0 \leq z \leq 0.1$)), lithium-manganese-nickel composite oxide (for example, $Li_xMn_{1/2}Ni_{1/2}O_2$), spinel-type lithium-manganese-nickel composite oxides (for example, $Li_xMn_{2-y}Ni_yO_4$), olivine-type lithium-phosphine oxide (for example, such as $Li_xFePO_4$, $Li_xFe_{1-y}Mn_yPO_4$, and $Li_xCoPO_4$), iron sulfates (for example, $Fe_2(SO_4)_3$), and vanadium oxide (for example, $V_2O_5$), as well as, conductive polymer material such as polyaniline and polypyrrole, disulfide-based polymer material, organic material and inorganic material such as sulfur (S) and carbon fluoride. As for x, y, and z without description of their preferable ranges, their values are preferably larger than 0 and smaller than 1.

As the negative electrode active material, one of these materials can be used, or two or more of these materials can be used.

Examples of conductive agent include, for example, carbon black, graphite, graphene, fullerene, cokes, carbon fiber, and metal powder. Among them, carbon black, graphite, and graphene are preferable. Examples of carbon black include acetylene black, Ketjen black, and furnace black.

Examples of binder include, for example, polytetrafluoroethylene (PTFE), polyvinylidene fluoride (PVdF), acryl resin, polyolefin resin, polyurethane resin, polyimide resin, fluorine-based rubber, and styrene-butadiene rubber.

The positive electrode current collector is desirably formed from aluminum foils or aluminum alloy foils. The mean crystalline particle size of the aluminum foils and aluminum alloy foils is preferably not larger than 50 μm, more preferably not larger than 30 μm, further preferably not larger than 5 μm. By making a mean crystalline particle size of aluminum foils or aluminum alloy foils not larger than 50 μm, a strength of aluminum foils or aluminum alloy foils can be dramatically increased. The high pressure can be applied the positive electrode material layer when the press process to make the positive electrode material layer high density, and to increase the positive electrode capacity.

A thickness of the current collector is desirably not larger than 20 μm, more preferably not larger than 15 μm. Aluminum foils preferably have a purity not lower than 99% by mass. Aluminum alloys are preferably alloys containing elements such as magnesium, zinc, and silicon. The content of alloy component transition metals such as iron, copper, nickel, and chromium is preferably not larger than 1 mass %.

A positive electrode may be prepared, for example, by adding a conductive agent and a binder to a positive electrode active material, suspending them in an appropriate solvent, coating a current collector such as aluminum foil with the suspension, and then drying and pressing the coated film, resulting a band-like electrode.

In this case, blending ratios of the positive electrode active material, the conductive agent, and the binder are preferably within 80% by weight to 95% by weight, 3% by weight to 20% by weight, and 2% by weight to 7% by weight, respectively.

3) Nonaqueous Electrolyte

The Nonaqueous electrolyte can comprise a nonaqueous solvent and an electrolyte salt to be dissolved by the nonaqueous solvent. The nonaqueous solvent may contain a polymer. The nonaqueous electrolyte preferably contains a Li salt containing boron as an electrolyte salt.

Examples of the electrolyte salt include lithium salts such as $LiPF_6$, $LiBF_4$, $Li(CF_3SO_2)_2N$ (lithium bis(trifluoromethanesulfonyl)imide, commonly known as LiTFSI), $LiCF_3SO_3$ (commonly known as LiTFS), $Li(C_2F_5SO_2)_2N$ (lithium bis(pentafluoroethanesulfonyl)imide, commonly known as LiBETI), $LiClO_4$, $LiAsF_6$, $LiSbF_6$, lithium bis(oxalato)borate ($LiB(C_2O_4)_2$, commonly known as LiBOB), lithium difluoro(oxalato)borate ($LiF_2BC_2O_4$), lithium difluoro(trifluoro-2-oxide-2-trifluoro-methyl propionate(2-)-0,0)borate ($LiBF_2(OCOOC(CF_3)_2)$, commonly known as $LiBF_2$(HHIB)), and lithium difluorophosphate ($LiPO_2F_2$). One of these electrolyte salts may be used, or a combination of two or more of these electrolyte salts may be used. Especially preferable salts are $LiPF_6$, $LiBF_4$, lithium bis(oxalato)borate ($LiB(C_2O_4)_2$, commonly known as LiBOB), lithium difluoro(oxalato)borate ($LiF_2BC_2O_4$), lithium difluoro(trifluoro-2-oxide-2-trifluoro-methyl propionate(2-)-0,0)borate ($LiBF_2(OCOOC(CF_3)_2)$, commonly known as $LiBF_2$(HHIB)), and lithium difluorophosphate ($LiPO_2F_2$).

The concentration of the electrolyte salt is preferably within a range of 0.5 M to 3.0 M. If a concentration is within the range, a battery property when a high-load current flows can be improved.

Examples of nonaqueous solvents include, but are not particularly limited to, propylene carbonate (PC), ethylene carbonate (EC), 1,2-dimetoxyethane (DME), γ-butyrolactone (GBL), tetrahydrofuran (THF), 2-methyltetrahydrofuran (2-MeHF), 1,3-dioxolane, sulfolane, acetonitrile (AN), diethyl carbonate (DEC), dimethyl carbonate (DMC), methyl ethyl carbonate (MEC), and dipropyl carbonate (DPC). One of these solvent may be used, or a combination of two or more of these solvents may be used. When two or more of solvents are combined, all solvents preferably have a dielectric constant of 20 or more.

Additives may be added to the nonaqueous electrolyte. Examples of additives include, but are not particularly limited to, vinylene carbonate (VC), fluorovinylene carbonate, methylvinylene carbonate, fluoromethylvinylene carbonate, ethylvinylene carbonate, propylvinylene carbonate, butylvinylene carbonate, dimethylvinylene carbonate, diethylvinylene carbonate, dipropylvinylene carbonate, vinylene acetate (VA), vinylene butyrate, vinylene hexanate, vinylene crotonate, catechol carbonate, propane sultone, and butane sultone. One of these additives may be used, or a combination of two or more of these additives may be used.

4) Separator;

Examples of a material of the separator include, but are not particularly limited to, porous films or nonwoven cloth made of polymer, such as polyolefin, cellulose, polyester, polyvinyl alcohol, polyamide, polytetrafluoroethylene, and vinylon. The porous films or nonwoven cloth may comprise inorganic particles. The material of the separator may be one kind, or may be a combination of two kinds or more.

5) Container Member

As container member, a laminated film with thickness of not larger than 0.5 mm or a metal container with wall thickness of not larger than 3 mm is used. The wall thickness of the metal container is more preferably not larger than 0.5 mm. A resin container made of resin, such as polyolefin resin, polyvinyl chloride resin, polystyrene-based resin, acryl resin, phenol resin, polyphenylene-based resin, and fluorine-based resin may be also used.

The shape of the container member, that is, shape of the battery, may be flattened (thin-type), rectangle, cylindrical, coin-type, button-type, and the like. The battery may be amounted to any of small-sized devices, for example, portable electronic devices, and large-sized vehicles, for example, two-wheel to four-wheel automobiles.

As the laminated film, a multi-layered film in which metal layer is sandwiched between resin layers is used. For weight saving, the metal layer is preferably aluminum foil or aluminum alloy foil. Polymers such as polypropylene (PP), polyethylene (PE), nylon, and polyethylene terephthalate (PET) can be used in the resin layer. The container member can be shaped by heat sealing the laminated film.

The metal container is made from aluminum, or aluminum alloys, and the like. Aluminum alloys are preferably alloys containing elements such as magnesium, zinc, and silicon. If the alloy contains transition metals such as iron, copper, nickel and chromium, the content thereof is preferably not larger than 100 ppm.

6) Negative Electrode Terminal

The negative electrode terminal can be formed from aluminum, or aluminum alloys containing at least one element selected from Mg, Ti, Zn, Mn, Fe, Cu, or Si. In order to reduce the contact resistance with the negative electrode current collector, the negative electrode terminal is preferably formed from the same material as that of the negative electrode current collector.

7) Positive Electrode Terminal

The positive electrode terminal is preferably formed from aluminum, or aluminum alloys containing at least one element selected from Mg, Ti, Zn, Ni, Cr, Mn, Fe, Cu, or Si. In order to reduce the contact resistance with the positive electrode current collector, the positive electrode terminal is preferably formed from the same material as that of the positive electrode current collector.

Next, an example of a nonaqueous electrolyte battery according to the first embodiment will be explained in detail with reference to the drawings.

FIG. 1 is an exploded perspective view of an example of a nonaqueous electrolyte battery according to the first embodiment. FIG. 2 is a partially developed perspective view of an electrode group included in the nonaqueous electrolyte battery shown in FIG. 1.

The battery 100 shown in FIG. 1 is a sealed nonaqueous electrolyte battery in a rectangular shape. The nonaqueous electrolyte battery 100 includes an casing can 1, a lid 2, a positive electrode external terminal 3, a negative electrode external terminal 4, and an electrode group 5. The casing can 1 and the lid 2 constitute the container member.

The casing can 1 has a rectangular tubular shape with a bottom, and is formed from a metal such as aluminum, aluminum alloy, iron, or stainless-steal.

As shown in FIG. 2, the flatted electrode group 5 has the positive electrode 6, the negative electrode 7 and separators 8 sandwiched between the positive electrode 6 and the negative electrode 7, which are wound into a flattened shape. The positive electrode 6 includes a band-like positive electrode current collector, for example, made of a metal foil, a positive electrode current collecting tab 6a including an edge part of the positive electrode current collector which is parallel to the long side of the positive electrode current collector, and a positive electrode material layer (positive electrode active material-containing layer) 6b formed on the positive electrode current collector except for at least the part corresponding to the positive electrode current collecting tab 6a. On the other hand, the negative electrode 7 includes a band-like positive electrode current collector, for example, made of a metal foil, a negative electrode current collecting tab 7a including an edge part of the negative electrode current collector which is parallel to the long side of the negative electrode current collector, and a negative electrode material layer (negative electrode active material-containing layer) 7b formed on the negative electrode current collector except for at least the part corresponding to negative electrode current collecting tab 7a.

The positive electrode 6, the separator 8, and the negative electrode 7 are wound while shifting the position of the positive electrode 6 with respect to the position of the negative electrode 7 such that the positive current collecting tab 6a protrudes from the separator 8 in the winding axis direction of the electrode group 5 and the negative current collecting tab 7a protrudes from the separator 5 in the opposite direction. By winding the positive and negative electrodes as described above, as shown in FIG. 2, the positive current collecting tab 6a protrudes from one end face of the electrode group 5 and the negative current collecting tab 7a protrudes from the other end face of the electrode group 7a. The electrode group 5 is impregnated with the electrolyte (not shown in the drawing).

As shown in FIG. 1, each of the positive electrode current collecting tab 6a and the negative electrode current collecting tab 7a is separate to two bundles in near the winding center of the electrode group 5, and each of the tabs is held by a conductive holding member 9. The holding member 9 is almost U-shaped, and includes the first holding part 9a, the second holding part 9b, and a connecting part 9c which electrically connects the first holding part 9a and the second holding part 9b. One bundle of the positive electrode current collecting tab 6a is held by the first holding part 9a of one holding member 9, and the other bundle of the positive electrode current collecting tab 6a is held by the second holding part 9b of the same holding member 9. In the same way, one bundle of the negative electrode current collecting tab 7a is held by the first holding part 9a of the other holding member 9, and another bundle of the negative electrode current collecting tab 7a is held by the second holding part 9b of the same holding member 9.

A positive electrode lead 10 includes a support plate 10a having an almost rectangular shape, a through-hole 10b opened in the support plate 10a, and strip-like current collecting parts 10c and 10d which branch from the support plate 10a and extend downward. The other hand, a negative electrode lead 11 includes a support plate 11a having an almost rectangular, a through-hole 11b opened in the support plate 11a, and strip-like current collecting parts 11c and 11d which branch from the support plate 11a and extend downward.

The current collecting parts 10c and 10d of the positive electrode lead 10 sandwiches one holding member 9 between them. The current collecting part 10c is placed on the first holding part 9a of the holding member 9, and the current collecting part 10d is placed on the second holding part 9b. The current collecting parts 10c and 10d, the first holding part 9a and the second holding part 9b, and the positive electrode current collecting tab 6a are joined by, for example, ultrasonic welding. Thus, the positive electrode 6 of the electrode group 5 and the positive electrode lead 10 are electrically connected through the positive electrode current collecting tab 6a.

The current collecting parts 11c and 11d of the negative electrode lead 11 sandwiches the other holding member 9 between them. The current collecting part 11c is placed on the first holding part 9a of the holding member 9, and the current collecting part 11d is placed on the second holding part 9b. The current collecting parts 11c and 11d, the first holding part 9a and the second holding part 9b, and the negative electrode current collecting tab 7a are joined by, for example, ultrasonic welding. Thus, the negative electrode 7 of the electrode group 5 and the negative electrode lead 11 are electrically connected through the negative electrode current collecting tab 7a.

Materials of the positive electrode lead 10 and the negative electrode lead 11 and materials of the holding members 9 are not especially specified, but are preferably the same as those of the positive electrode external terminal 3 and the negative electrode external terminal 4. For the positive electrode external terminal 3, for example, aluminum or aluminum alloy is used, and for the negative electrode external terminal 4, for example, such as aluminum, aluminum alloy, copper, nickel, or nickel-plated iron is used. For example, when the material of the external terminal is aluminum or aluminum alloy, the material of the lead is preferably aluminum or aluminum alloy. When the material of the external terminal is copper, the material of the lead is preferably copper.

The plate lid 2 having a rectangular shape is seam welded to the opening of the casing can 1 via, for example, laser. The lid 2 is formed from metals, for example, aluminum, aluminum alloy, iron, or stainless steel. The lid 2 and the casing can 1 are desirably made from the same kind of metal. The positive electrode external terminal 3 is electrically connected to the support plate 10a of the positive electrode lead 10, and the negative electrode external terminal 4 is electrically connected to the support plate 11a of the negative electrode lead 11. Between the positive electrode external terminal 3 and the lid 2, and between the negative electrode external terminal 4 and the lid 2, insulating gaskets 12 are placed, which provide insulation between the positive electrode external terminal 3 and the lid 2 and between the negative electrode external terminal 4 and the lid 2. The insulating gasket 12 is desirably a resin molding.

According to the first embodiment, a nonaqueous electrolyte battery is provided. In this nonaqueous electrolyte battery, a negative electrode includes a negative electrode active material having a Li-absorbing potential of 1 V vs. Li/Li$^+$ or more. The electrical resistance of the negative electrode in a discharged state is within a range of 100 Ω·cm to 100000 Ω·cm. Furthermore, a pore volume ratio of pores having a pore diameter of 1 μm or more in the separator is more than 70%. This nonaqueous electrolyte battery can prevent clogging of the separator and can prevent self-discharge. As a result, this nonaqueous electrolyte battery can show an excellent life property, and can suppress self-discharge.

(Second Embodiment)

According to a second embodiment, there is provided a battery pack. The battery pack includes the nonaqueous electrolyte battery according to the first embodiment.

The battery pack according to the second embodiment may include a nonaqueous electrolyte battery, or nonaqueous electrolyte batteries. In the case that the battery pack includes nonaqueous electrolyte batteries, the unit cells are arranged and electrically connected in series or in parallel, or in combination of the series connection and the parallel connection.

The battery pack according to the second embodiment, will be described with reference to the drawings.

Figure 3:
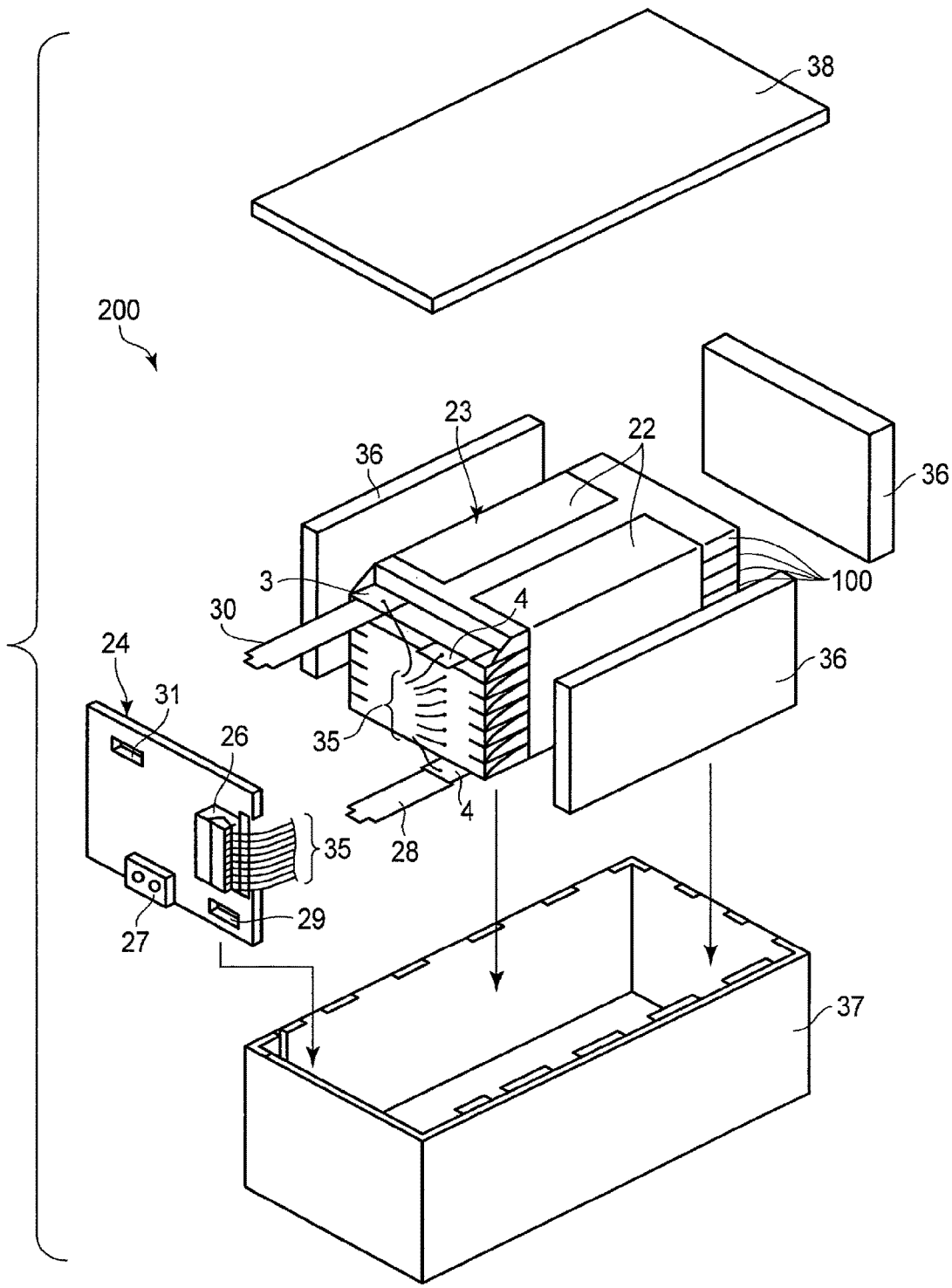
FIG. 3 is an exploded perspective view of an example of the battery pack according to the second embodiment.
Figure 4:
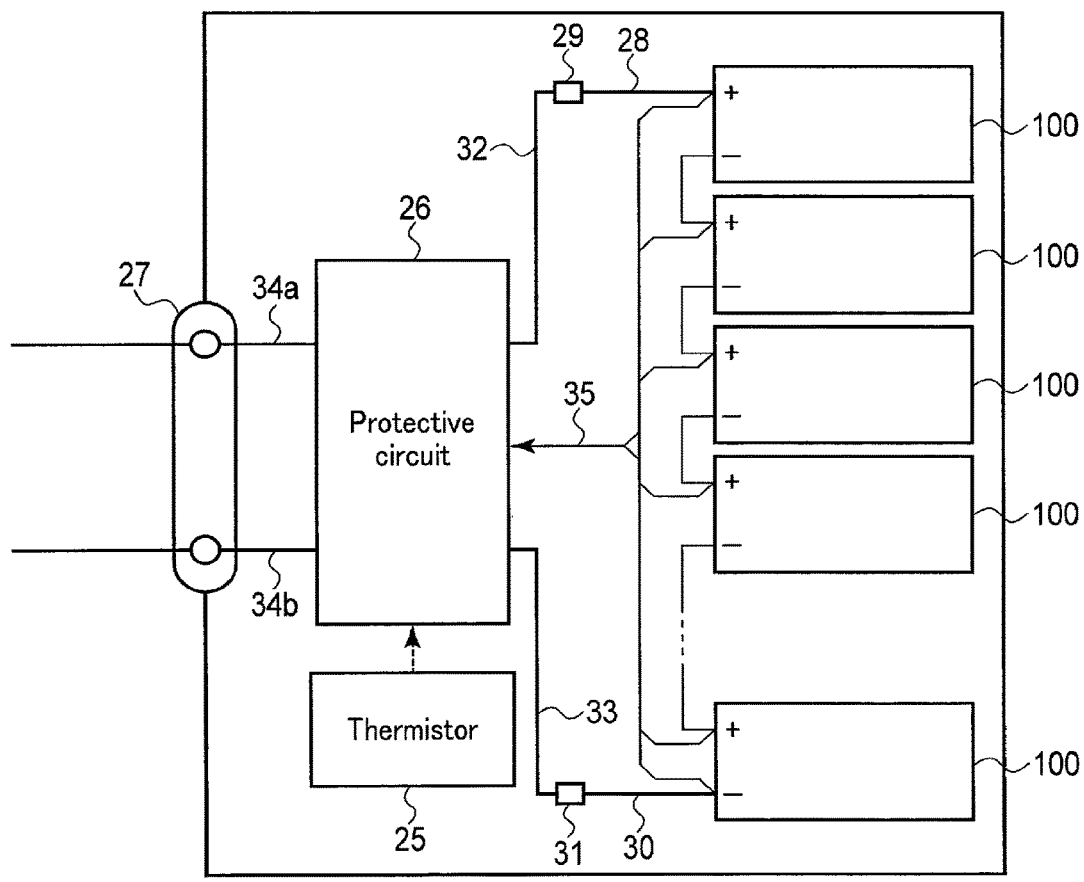
FIG. 4 is a block diagram showing electric circuits of the battery pack of FIG. 3.

FIG. 3 is an exploded perspective view of an example of the battery pack according to the second embodiment. FIG. 4 is a block diagram showing electric circuits of the battery pack of FIG. 3.

The battery pack shown in FIGS. 3 and 4 includes the plurality of flattened battery 100 each having the structure shown in FIGS. 1 and 2.

The plurality of unit cells 100 are stacked in such a manner that the negative electrode external terminals 4 and the positive electrode external terminals 3 each extended outward are oriented to an identical direction and fastened by an adhesive tape 22 to form an battery module 23. The unit cells 100 are electrically connected to one another in series, as shown in FIG. 4.

A printed wiring board 24 is so disposed as to face lateral surfaces of the unit cells 100 from which the negative electrode external terminals 4 and the positive external electrode terminals 3 are extended. On the printed wiring board 24, a thermistor 25, a protective circuit 26, and an energizing terminal 27 for an external instrument are mounted, as shown in FIG. 4. An insulation plate (not shown) is provided on a surface of a protective circuit substrate 24 facing to the battery module 23 in order to avoid unnecessary connection to the wirings of the battery module 23.

A positive electrode-side lead 28 is connected to the positive electrode terminal 3 of the unit cell 100 positioned at the bottom of the battery module 23, and a end thereof is inserted into a positive electrode-side connector 29 of the printed wiring board 24 to establish electrical connection. A negative electrode-side lead 30 is connected to the negative electrode terminal 4 of the unit cell 100 positioned at the top layer of the battery module 23, and an end thereof is inserted into a negative electrode-side connector 31 of the printed wiring board 24 to establish electrical connection. The connectors 29 and 31 are connected to the protective circuit 26 via wirings 32 and 33 formed on the printed wiring board 24.

The thermistor 25 detects a temperature of each of the unit cells 21, and a detection signal thereof is sent to the protective circuit 26. The protective circuit 26 is capable of shutting a plus-side wiring 34a and a minus-side wiring 34b between the protective circuit 26 and the energizing terminal 27 for external instrument under predetermined conditions. The examples of the predetermined conditions includes the case where a signal indicating a temperature of the unit cell 100 being equal to or higher than a predetermined temperature is received from the thermistor 25. Also, the other example of the predetermined conditions is the case of a detection of overcharge, overdischarge, overcurrent, or the like of the unit cell 100. The detection of overcharge or the like may be performed on each of the unit cells 100 or on the entire unit cells 100. In the case where the detection is performed on each of the unit cells 100, a battery voltage may be detected, or a positive electrode potential or a negative electrode potential may be detected. In the latter case, a lithium electrode to be used as a reference electrode is inserted into each of the unit cells 100. In the case of FIGS. 3 and 4, a wiring 35 for voltage detection is connected to each of the unit cells 21, and detection signals are sent to the protective circuit 26 via the wirings 35.

A protection sheet 36 made from a rubber or a resin is provided on each of three surfaces of the battery module 23 except for the lateral surface from which the positive electrode external terminals 3 and the negative electrode external terminals 4 are projected.

The battery module 23 is housed in a housing container 37 together with the protection sheets 36 and the printed wiring board 24. In other words, the protection sheets 36 are disposed beside both of inner lateral surfaces in a length direction and an inner lateral surface in a width direction of the housing container 37, and the printed wiring board 24 is disposed beside the opposite inner lateral surface in the width direction. The battery module 23 is positioned in a space defined by the protection sheets 36 and the printed wiring board 24. A lid 38 is attached to a top surface of the housing container 37.

The battery module 23 may be fixed by using a heat-shrinkable tape in place of the adhesive tape 22. In this case, the protection sheets are disposed on both of the lateral surfaces of the battery module, and a heat-shrinkable tube is wound around, followed by heat-shrinking the heat-shrinkable tube, thereby banding the battery module.

Though the battery pack shown in FIGS. 3 and 4 has the mode in which the unit cells 100 are connected in series, in the battery pack according to the second embodiment, unit cells 100 are connected in parallel in order to increase the battery capacity. Alternatively, the battery pack according to the second embodiment may include unit cells 100 connected in a combination of the series connection and the parallel connection.

Also, though the battery pack shown in FIGS. 3 and 4 include unit cells, the battery pack according to the second embodiment can a unit cell.

Also, the mode of the battery pack may be appropriately changed depending on its application. The battery pack according to the present embodiment is preferably used in the application where the excellent cycle characteristics at the large current output is required. More specifically, examples of the application include a usage as a power source for a digital camera and an in-vehicle usage in a two- to four-wheel hybrid electric car, a two- to four-wheel electric car, and an electric power-assisted bicycle. Particularly, the in-vehicle usage is suitable.

The battery pack according to the second embodiment include the nonaqueous electrolyte battery according to the first embodiment. Thus, the battery pack according to the second embodiment can exhibit an excellent life property, and can suppress self-discharge.

EXAMPLES

Examples will be described below; however, the present invention is not limited to the Examples described below without departing from the scope of the present invention.

Example 1

In Example 1, a nonaqueous electrolyte battery 100 having a structure shown FIGS. 1 and 2 was prepared as follows:

<Manufacture of Positive Electrode 6>

As a positive electrode active material, $LiNi_{0.5}Co_{0.2}Mn_{0.3}O_2$ was provided. As conductive agents, graphite and acetylene black were provided. As a binder, polyvinylidene fluoride (PVdF) was provided. Next, the positive electrode active material, graphite, acetylene black, and PVdF were mixed to obtain a mixture. At that time, graphite was added in an amount to be 2.5% by weight based on the weight of a positive electrode to be manufactured. Acetylene black was added in an amount to be 2.5% by weight based on the weight of a positive electrode to be manufactured. PVdF was added in an amount to be 5% by weight based on the weight of a positive electrode to be manufactured. Then, the obtained mixture was dispersed into n-methylpyrrolidone (NMP) to prepare a slurry. An aluminum foil having a thickness of 15 was coated with the obtained slurry to make a coating amount of 80 g/m², and the coated film was dried. And then, the dried coated-film was pressed. Thus, a positive electrode 6 having an electrode density of 3.0 g/cm³ was manufactured.

<Manufacture of Negative Electrode 7>

As a negative electrode active material, a spinel-type lithium-titanium composite oxide, $Li_4Ti_5O_{12}$, having a Li-absorbing potential within the range of 1.4 V vs. Li/Li⁺ to 2.0 V vs. Li/Li⁺, and a specific surface area of 10 m²/g, was provided. As a conductive agent, graphite having a specific surface area of 18 m²/g was provided. And as a binder, PVdF was provided. Next, the negative electrode active material, graphite, and PVdF were mixed to obtain a mixture. At that time, graphite was added in an amount to be 5% by weight based on the weight of a negative electrode to be manufactured. PVdF was added in an amount to be 5% by weight based on the weight of a negative electrode to be manufactured. Then, the obtained mixture was dispersed into N-methylpyrrolidone (NMP) solvent to prepare a slurry. An aluminum foil having a thickness of 15 μm was coated with the obtained slurry to make a coating amount of 120 g/m², and the coated film was dried. And then, the dried coated-film was pressed, and thus a negative electrode material layer was formed on the current collector. Thus, a band-like negative electrode 7 having an electrode density of 2.1 g/cm³ was manufactured.

In the negative electrode 7, the specific surface area A of the spinel-type lithium-titanium composite oxide was 10 m²/g, a weight content ratio B of the spinel-type lithium-titanium composite oxide was 90, the specific surface area C of the graphite was 18 m²/g, and the weight content ratio D of the graphite was 5. That is, for the negative electrode 7 of Example 1, the value of AB/CD was 10.

<Preparation of Nonaqueous Electrolyte>

Into a nonaqueous solvent containing 33% by volume of propylene carbonate (PC) and 67% by volume of dimethyl carbonate (DMC), 1.0 M of $LiPF_6$ was mixed and dissolved, and a nonaqueous electrolyte was prepared.

<Assembly of Battery>

A separator 8 made of cellulose nonwoven having a thickness of 20 μm was provided.

This separator 8 was impregnated with the nonaqueous electrolyte prepared before. Then, the positive electrode 6 manufactured before was covered with this separator 8, and the negative electrode 7 manufactured before was stacked so that the negative electrode 7 opposed the positive electrode 6 through the separator 8, and a laminate was obtained. This laminate was spirally wound, and an electrode group 5 in a spirally wound shape was manufactured. This electrode group 5 was shaped by pressing to a flattened shape as shown in FIG. 2.

This flattened electrode group 5 was inserted into a can-like container 1 made of an aluminum with a wall thickness of 0.3 mm, and the container was sealed with a lid 2. Thus, a flattened type nonaqueous electrolyte battery 100 with dimensions of a thickness of 5 mm, a width of 30 mm, a height of 25 mm, and a weight of 100 g, shown in FIGS. 1 and 2, was manufactured.

<Measuring Battery Capacity>

The obtained battery was charged at a constant current of 20 mA at 25° C. until the battery voltage became 2.8 V, then charged at a constant voltage until the charging current became 5 mA. Then, the battery was discharged at 20 mA until the battery voltage became 1.5 V to confirm a battery capacity. The thus measured battery capacity was 250 mAh.

<Evaluating Life Property>

The obtained battery was regulated at 25° C. so that the battery voltage became 2.0 V, and its resistance value at 1 KHz was measured. Then, the obtained battery was subjected to 50000 cycles of a cycle test in which the battery was charged at 60° C. at a current value of 5 C and at 2.6 V, then discharged at a current value of 5 C and at 1.8 V. And then, atmospheric temperature was made 25° C., the obtained battery was regulated so that the battery voltage became 2.0 V, and its resistance value at 1 KHz was measured.

<Evaluating Self-Discharge>

The obtained battery was discharged at 25° C. and 20 mA until the battery voltage became 1.5 V, then, charged at 20 mA to half of the battery capacity, that is, the battery capacity became 125 mAh. The obtained battery was left at −20° C. for two weeks, and atmospheric temperature was made 25° C., the obtained battery was discharged at 20 mA until the battery voltage became 1.5 V. The battery capacity was measured after this discharge. By reducing the obtained battery capacity from the half battery capacity, the amount of self-discharge was calculated.

<Electrical Resistance of Negative Electrode in Discharged State>

The electrical resistance of negative electrode 7 included in the nonaqueous electrolyte battery 100 of Example 1 in a discharged state was measures as described above. The electrical resistance of negative electrode 7 in a discharged state was 8000 Ω·cm.

<Measuring Pore Diameter Distribution of Separator 8>

Figure 5:
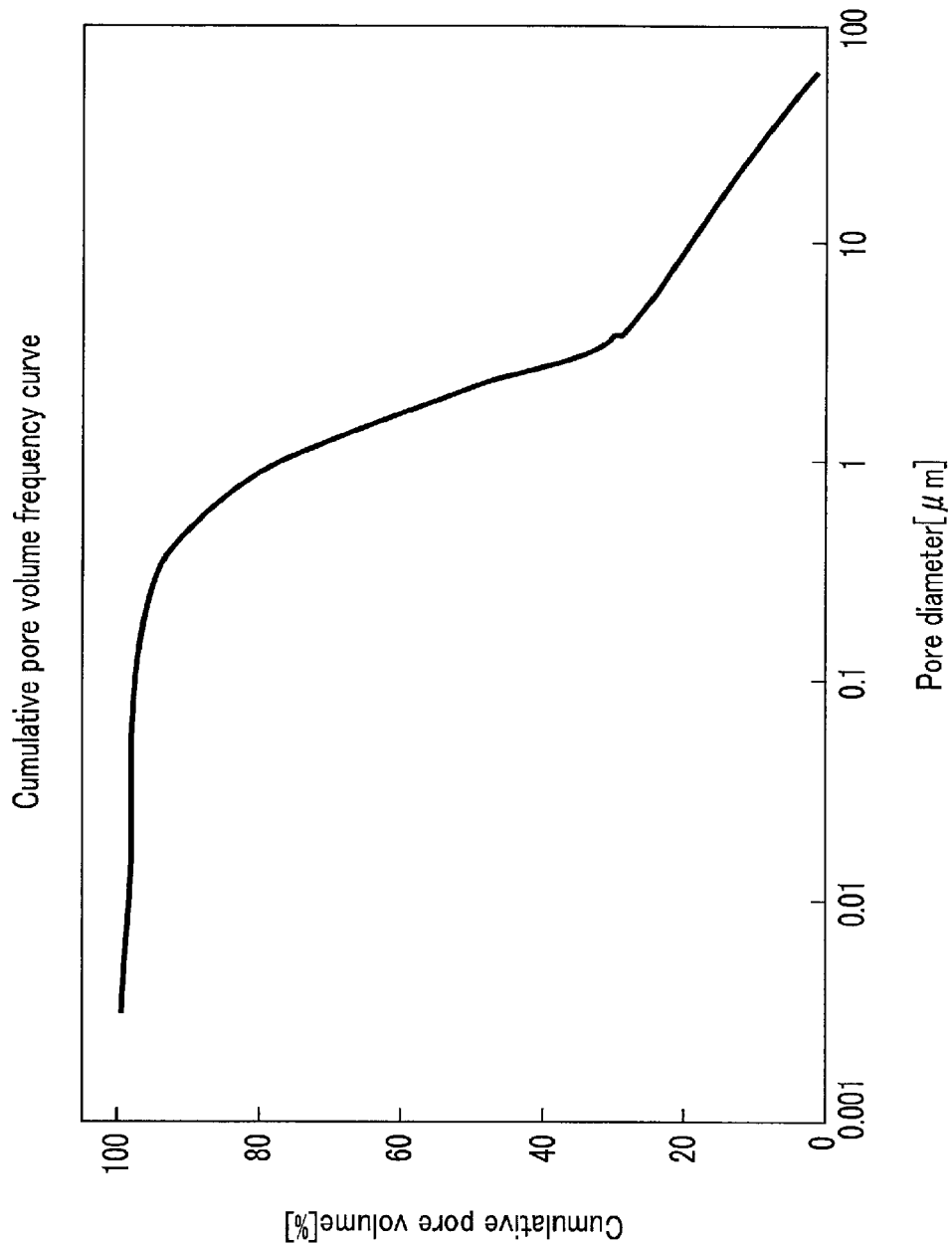
FIG. 5 is the cumulative pore volume frequency curve of the separator included in the nonaqueous electrolyte battery of Example 1.
Figure 6:
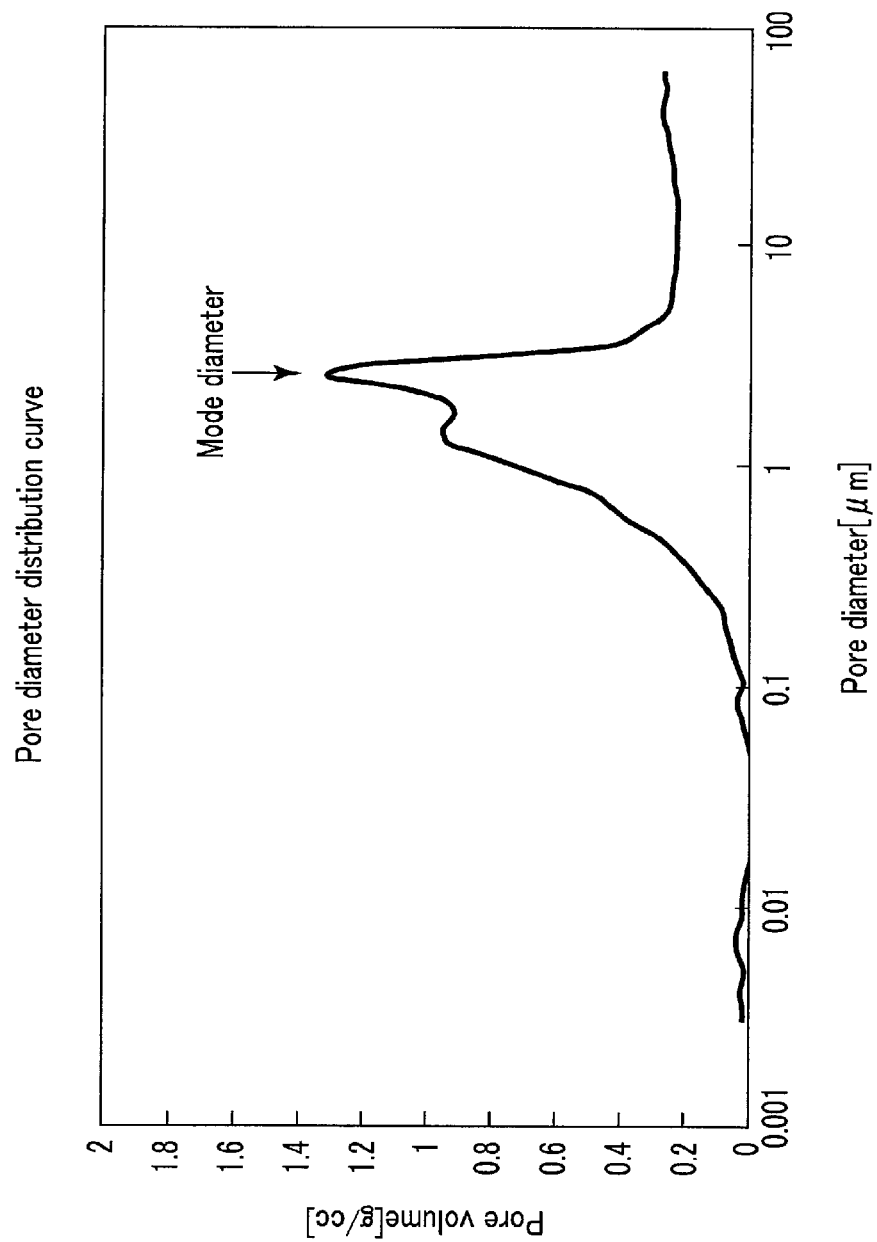
FIG. 6 is the pore diameter distribution curve of the separator included in the nonaqueous electrolyte battery of Example 1.

Measuring of the pore diameter distribution of separator 8 included in the nonaqueous electrolyte battery 100 of Example 1 was performed via the mercury intrusion porosimetry described above. As a result of this measurement of pore diameter distribution, the obtained cumulative pore volume frequency curve is shown in FIG. 5, and the obtained pore diameter distribution curve is shown in FIG. 6. FIGS. 5 and 6 are semilog graphs where the horizontal axis shows the logarithmic value of pore diameter (μm).

From the cumulative pore volume frequency curve shown in FIG. 5, it was found that, in the separator 8 included in the nonaqueous electrolyte battery 100 of Example 1, the pore volume ratio of pores having a pore diameter of 1 μm or more was 78%. Also, from the pore diameter distribution curve shown in FIG. 6, it was found that the mode diameter of the separator 8 was 2.6 μm.

Example 2

In Example 2, a battery was manufactured in the same way as Example 1 except that bronze-type titanium dioxide $TiO_2$ (B) having a Li-absorbing potential within the range of 1.2 V vs. $Li/Li^+$ to 2.0 V vs. $Li/Li^+$ was used as the negative electrode active material. The weight content ratio of $TiO_2$ (B) in the negative electrode 7 was the same as that in Example 1.

Example 3

In Example 3, a battery was manufactured in the same way as Example 1 except that monoclinic niobium-titanium oxide $Nb_2TiO_7$ having a Li-absorbing potential within the range of 1.0 V vs. $Li/Li^+$ to 2.0 V vs. $Li/Li^+$ was used as the negative electrode active material. The weight content ratio of $Nb_2TiO_7$ in the negative electrode 7 was the same as that in Example 1.

Examples 4 and 5

In Examples 4 and 5, a nonaqueous electrolyte battery was manufactured in the same way as Example 1 except that the separator was changed.

Example 6

In Example 6, a nonaqueous electrolyte battery was manufactured in the same way as Example 1 except that a negative electrode manufactured as follows was used.

As a negative electrode active material, a spinel-type lithium-titanium composite oxide, $Li_4Ti_5O_{12}$, having a Li-absorbing potential within the range of 1.4 V vs. $Li/Li^+$ to 2.0 V vs. $Li/Li^+$, and a specific surface area of 10 $m^2/g$ was provided. As a conductive agent, graphite having a specific surface area of 18 $m^2/g$ was provided. And as a binder, PVdF was provided. Next, the negative electrode active material, graphite, and PVdF were mixed to obtain a mixture. At that time, graphite was added in an amount to be 2.85% by weight based on the weight of a negative electrode to be manufactured. PVdF was added in an amount to be 5% by weight based on the weight of a negative electrode to be manufactured. Then, the obtained mixture was dispersed into N-methylpyrrolidone (NMP) solvent to prepare a slurry. An aluminum foil having a thickness of 15 μm was coated with the obtained slurry to make a coating amount of 155 $g/m^2$, and the coated film is dried. The dried coated-film was pressed to form a negative electrode material layer on the current collector. Thus, a band-like negative electrode having an electrode density of 2.1 $g/cm^3$ was manufactured.

In the negative electrode 7, the specific surface area A of the spinel-type lithium-titanium composite oxide was 10 $m^2/g$, a weight content ratio B of the spinel-type lithium-titanium composite oxide was 92.15, the specific surface area C of the graphite was 18 $m^2/g$, and the weight content ratio D of the graphite was 2.85. That is, in the negative electrode 7 of Example 6, value of AB/CD was 18.

Example 7

In Example 7, a nonaqueous electrolyte battery was manufactured in the same way as Example 1 except that a negative electrode manufactured as follows was used.

As a negative electrode active material, a spinel-type lithium-titanium composite oxide, $Li_4Ti_5O_{12}$, having a Li-absorbing potential within the range of 1.4 V vs. $Li/Li^+$ to 2.0 V vs. $Li/Li^+$, and a specific surface area of 10 $m^2/g$, was provided. As a conductive agent, graphite having a specific surface area of 18 $m^2/g$ was provided. And as a binder, PVdF was provided. Next, the negative electrode active material, graphite, and PVdF were mixed to obtain a mixture. At that time, graphite was added in an amount to be 9.5% by weight based on the weight of a negative electrode to be manufactured. PVdF was added in an amount to be 5% by weight based on the weight of a negative electrode to be manufactured. Then, the obtained mixture was dispersed into N-methylpyrrolidone (NMP) solvent to prepare a slurry. An aluminum foil having a thickness of 15 μm was coated with the obtained slurry to make a coating amount of 155 $g/m^2$, and the coated film was dried. The dried coated-film was pressed to form a negative electrode material layer on the current collector. Thus, a band-like negative electrode having an electrode density of 2.1 $g/cm^3$ was manufactured.

In the negative electrode 7, the specific surface area A of the spinel-type lithium-titanium composite oxide was 10 $m^2/g$, a weight content ratio B of the spinel-type lithium-titanium composite oxide was 85.5, the specific surface area C of the graphite was 18 $m^2/g$, and the weight content ratio D of the graphite was 9.5. That is, in the negative electrode 7 of Example 7, the value of AB/CD was 5.

Examples 8 to 10

In Examples 8 to 10, a nonaqueous electrolyte battery was manufactured in the same way as Example 1 except that the separator was changed.

Comparative Example A

In Comparative Example A, a nonaqueous electrolyte battery was manufactured in the same way as Example 1 except that the separator was changed.

Comparative Example B

In Comparative Example B, a nonaqueous electrolyte battery was manufactured in the same way as Example 1 except that a negative electrode manufactured as follows was used.

As a negative electrode active material, a spinel-type lithium-titanium composite oxide, $Li_4Ti_5O_{12}$, having a Li-absorbing potential within the range of 1.4 V vs. $Li/Li^+$ to 2.0 V vs. $Li/Li^+$, and a specific surface area of 10 $m^2$/g was provided. As a conductive agent, graphite having a specific surface area of 18 $m^2$/g was provided. And as a binder, PVdF was provided. Next, the negative electrode active material, graphite, and PVdF were mixed to obtain a mixture. At that time, graphite was added in an amount to be 15% by weight based on the weight of a negative electrode to be manufactured. PVdF was added in an amount to be 5% by weight based on the weight of a negative electrode to be manufactured. Then, the obtained mixture was dispersed into N-methylpyrrolidone (NMP) solvent to prepare a slurry. An aluminum foil having a thickness of 15 μm was coated with the obtained slurry to make a coating amount of 155 $g/m^2$, and the coated film was dried. The dried coated-film was pressed to form a negative electrode material layer on the current collector. Thus, a band-like negative electrode having an electrode density of 2.1 $g/cm^3$ was manufactured.

In the negative electrode 7, the specific surface area A of the spinel-type lithium-titanium composite oxide was 10 $m^2$/g, a weight content ratio B of the spinel-type lithium-titanium composite oxide was 80, a specific surface area C of the graphite was 18 $m^2$/g, and the weight containing ratio D of the graphite was 15. That is, for the negative electrode 7 of Comparative Example B, the value of AB/CD was 3.

Comparative Example C

In Comparative Example C, a nonaqueous electrolyte battery was manufactured in the same way as Example 1 except that a negative electrode manufactured as follows was used.

As a negative electrode active material, a spinel-type lithium-titanium composite oxide, $Li_4Ti_5O_{12}$, having a Li-absorbing potential within the range of 1.4 V vs. $Li/Li^+$ to 2.0 V vs. $Li/Li^+$, and a specific surface area of 10 $m^2$/g was provided. And as a binder, PVdF was provided. Next, the negative electrode active material and PVdF were mixed to obtain a mixture was obtained. At that time, PVdF was added in an amount to be 5% by weight based on the weight of a negative electrode to be manufactured. Then, the obtained mixture was dispersed into N-methylpyrrolidone (NMP) solvent to prepare a slurry. An aluminum foil having a thickness of 15 μm was coated with the obtained slurry to make a coating amount of 130 $g/m^2$, and the coated film was dried. The dried coated-film was pressed to form a negative electrode material layer on the current collector. Thus, a band-like negative electrode having an electrode density of 2.1 $g/cm^3$ was manufactured.

That is, the negative electrode of the nonaqueous electrolyte battery of Comparative Example C did not include a conductive agent.

Comparative Example D

In Comparative Example D, a nonaqueous electrolyte battery was manufactured in the same way as Example 1 except that a negative electrode manufactured as follows was used.

As a negative electrode active material, a graphite having a Li-absorbing potential within the range of 0.01 V vs. $Li/Li^+$ to 0.9 V vs. $Li/Li^+$ was provided. And as a binder, PVdF was prepared. Next, the negative electrode active material and PVdF were mixed to obtain a mixture. At that time, PVdF was added in an amount to be 5% by weight based on the weight of a negative electrode to be manufactured. Then, the obtained mixture was dispersed into N-methylpyrrolidone (NMP) solvent to prepare a slurry. An aluminum foil having a thickness of 15 μm was coated with the obtained slurry to make a coating amount of 60 $g/m^2$, and the coated film was dried. The dried coated-film was pressed to form a negative electrode material layer on the current collector. Thus, a band-like negative electrode 7 having an electrode density of 1.5 $g/cm^3$ was manufactured.

The obtained battery was charged at a constant current of 20 mA at 25° C. until the battery voltage became 4.2 V, then charged at a constant voltage until the charging current became 5 mA. And then, the battery was discharged at 20 mA until the battery voltage became 3.0 V to confirm a battery capacity of the battery. The thus confirmed battery capacity was 250 mAh.

Comparative Examples E and F

In each of Comparative Examples E and F, a nonaqueous electrolyte battery was manufactured in the same way as Examples 2 and 3, respectively, except that the separator was changed.

For the nonaqueous electrolyte batteries of Examples 2 to 10, and Comparative Examples A to F, in the same way as Example 1, the life property evaluation, the self-discharge evaluation, the measurement of a resistance of the negative electrode in a discharged state, and the measurement of the pore diameter distribution of the separator were performed. These results, together with those of Example 1, are shown in the following Table 1 and Table 2.

TABLE 1

| | Negative Electrode | | | | Separator | | |
|---|---|---|---|---|---|---|---|
| | Active Material | Li Absorbing Potential of Active Material (V vs. $Li/Li^+$) | AB/CD | Resistance in Discharged State (Ω) | Pore Volume Ratio of Pores having Pore Diameter of 1 μm or more (%) | Mode Diameter (μm) | Thickness (μm) |
| Example 1 | $Li_4Ti_5O_{12}$ | 1.4~2.0 | 10 | 8000 | 78 | 2.6 | 20 |
| Example 2 | $TiO_2$ (B) | 1.2~2.0 | — | 10000 | 78 | 2.6 | 20 |
| Example 3 | $Nb_2TiO_7$ | 1.0~2.0 | — | 10000 | 78 | 2.6 | 20 |
| Example 4 | $Li_4Ti_5O_{12}$ | 1.4~2.0 | 10 | 8000 | 71 | 1.1 | 20 |
| Example 5 | $Li_4Ti_5O_{12}$ | 1.4~2.0 | 10 | 8000 | 96 | 7.8 | 20 |
| Example 6 | $Li_4Ti_5O_{12}$ | 1.4~2.0 | 18 | 80000 | 78 | 2.6 | 20 |
| Example 7 | $Li_4Ti_5O_{12}$ | 1.4~2.0 | 5 | 120 | 78 | 2.6 | 20 |
| Example 8 | $Li_4Ti_5O_{12}$ | 1.4~2.0 | 10 | 8000 | 78 | 2.6 | 3 |

TABLE 1-continued

| | Negative Electrode | | | | Separator | | |
|---|---|---|---|---|---|---|---|
| | Active Material | Li Absorbing Potential of Active Material (V vs. Li/Li+) | AB/CD | Resistance in Discharged State (Ω) | Pore Volume Ratio of Pores having Pore Diameter of 1 μm or more (%) | Mode Diameter (μm) | Thickness (μm) |
| Example 9 | $Li_4Ti_5O_{12}$ | 1.4~2.0 | 10 | 8000 | 78 | 2.6 | 2 |
| Example 10 | $Li_4Ti_5O_{12}$ | 1.4~2.0 | 10 | 8000 | 78 | 2.6 | 30 |
| Comparative Example A | $Li_4Ti_5O_{12}$ | 1.4~2.0 | 10 | 8000 | 67 | 0.9 | 20 |
| Comparative Example B | $Li_4Ti_5O_{12}$ | 1.4~2.0 | 3 | 90 | 78 | 2.6 | 20 |
| Comparative Example C | $Li_4Ti_5O_{12}$ | 1.4~2.0 | Not including Conductive Agent | 120000 | 78 | 2.6 | 20 |
| Comparative Example D | Graphite | 0.01~0.9 | — | 10 | 78 | 2.6 | 20 |
| Comparative Example E | $TiO_2$ (B) | 1.2~2.0 | — | 10000 | 67 | 0.9 | 20 |
| Comparative Example F | $Nb_2TiO_7$ | 1.0~2.0 | — | 10000 | 67 | 0.9 | 20 |

TABLE 2

| | Self-Discharge Amount (mAh) | Resistance Value at 1 kHz before Cycle Test (Ω) | Resistance Value at 1 kHz after Cycle Test (Ω) | Amount of Increase due to Cycle test (Ω) |
|---|---|---|---|---|
| Example 1 | 2 | 30 | 35 | 5 |
| Example 2 | 1 | 28 | 42 | 14 |
| Example 3 | 1 | 35 | 50 | 15 |
| Example 4 | 5 | 25 | 30 | 5 |
| Example 5 | 1 | 36 | 40 | 4 |
| Example 6 | 2 | 34 | 40 | 6 |
| Example 7 | 3 | 29 | 33 | 4 |
| Example 8 | 4 | 24 | 31 | 7 |
| Example 9 | 5 | 24 | 35 | 11 |
| Example 10 | 1 | 40 | 50 | 10 |
| Comparative Example A | 2 | 33 | 60 | 27 |
| Comparative Example B | 60 | 29 | 40 | 11 |
| Comparative Example C | 1 | 53 | 62 | 9 |
| Comparative Example D | 88 | 25 | 110 | 85 |
| Comparative Example E | 2 | 32 | 74 | 42 |
| Comparative Example F | 2 | 40 | 88 | 48 |

From the results of Table 1, it is found that nonaqueous electrolyte batteries 100 of Examples 1 to 10 could exhibit a low resistance value before the cycle test, and that they could suppress self-discharge due to storage and increase of resistance due to the cycle test.

When the results of Examples 1 to 3, in which different negative electrode active materials were used, are compared, it is found that even if the negative electrode active materials differed, as long as their Li-absorbing potentials are 1 V vs. Li/Li+ or more, they could suppress self-discharge due to storage and increase of resistance due to the cycle test.

In contrast, Comparative Example D, where graphite having a Li-absorbing potential of less than 1 V vs. Li/Li+ was used as a negative electrode active material exhibited significantly larger self-discharge due to storage and significantly larger increase of resistance due to the cycle test compared with those of Examples 1 to 3, which is considered to be caused by the low resistance of the negative electrode in a discharged state and the precipitation of lithium on the negative electrode during the cycle test, in Comparative Example D.

When results of Examples 1, 4, 5, and 8 to 10, and Comparative Example A in which only different separators were used, are compared, it is found that, in Comparative Example A, self-discharge could be suppressed in the same way as in Examples 1, 4, 5, and 8 to 10; however, increase of resistance due to the cycle test was significantly larger than that of Examples 1, 4, 5, and 8 to 10, which is considered to be caused by clogging of pores of the separator during the cycle test, because the pore volume ratio of pores having a pore diameter of 1 μm or more was less than 70% in Comparative Example A. Furthermore, by comparing results of Example 2 with those of Comparative Example E, and by comparing results of Example 3 with those of Comparative Example F, it was confirmed that, even if the negative electrode actives materials used differed, they exhibited the same tendency.

From comparison of results of Examples 1, 6, and 7 where electrical resistances in a discharged state of the negative electrodes were different, it is found that, in these Examples where electrical resistances in a discharge state were within a range of 100 Ω·cm to 100000 Ω·cm, self-discharge due to storage and increase of resistance due to the cycle test could be suppressed similarly.

In contrast, in Comparative Example B where electrical resistance in a discharged state of the negative electrode was less than 100 Ω·cm, self-discharge due to storage was significantly larger than that of Examples 1, 6, and 7, which is considered to be caused by a self-discharge reaction that progressed when a positive electrode and a negative electrode contact through a through hole of a separator, because the electrical resistance of the negative electrode in a discharged state was too low in Comparative Example B.

In Comparative Example C where electrical resistance in discharged state of the negative electrode was more than 100000 Ω·cm, its resistance value was significantly larger than that of Examples 1, 6, and 7, which is considered to be caused by too high electrical resistance in a discharged state of the negative electrode in Comparative Example C. Since the electrical resistance was too high, the battery of Comparative Example C exhibited a significantly deteriorated output property.

In the nonaqueous electrolyte battery according to at least an embodiment and Example explained above, the negative electrode includes a negative electrode active material having a Li-absorbing potential of 1 V vs. Li/Li$^+$ or more; an electrical resistance of the negative electrode in a discharge state is within a range of 100 Ω·cm to 100000 Ω·cm; and a pore volume ratio of pores having a pore diameter of 1 μm or more in the separator is more than 70%. Such a nonaqueous electrolyte battery can prevent clogging of the separator, and can prevent self-discharge. As a result, such a nonaqueous electrolyte battery can exhibit an excellent life property, and can suppress self-discharge.

While certain embodiments of the present invention have been described, these embodiments have been presented by way of example only, and are not intended to limit the scope of the invention. The novel embodiments may be embodied in a variety of other forms, and various omissions, substitutions and changes may be made without departing from the spirit of the invention. The accompanying claims and their equivalents are intended to cover such forms or modifications as would fall within the scope and spirit of the invention.

What is claimed is:

1. A nonaqueous electrolyte battery, comprising:
    a positive electrode;
    a negative electrode;
    a separator sandwiched between the positive electrode and the negative electrode; and
    a nonaqueous electrolyte,
    wherein:
    the negative electrode comprises a spinel-type lithium-titanium composite oxide as a negative electrode active material, $Li_{4+x}Ti_5O_{12}$ where $0 \leq x \leq 3$, having a Li-absorbing potential of 1 V vs. Li/Li$^+$ or more;
    an electrical resistance of the negative electrode in a discharged state is within a range of 100 Ω·cm to 100000 Ω·cm;
    a pore volume ratio of pores having a pore diameter of 1 μm or more in the separator is within a range of more than 70% to not more than 78%, the pore volume ratio being determined from a cumulative pore volume frequency curve of the separator according to a mercury intrusion porosimetry; and
    a mode diameter in a pore diameter distribution curve of the separator according to the mercury intrusion porosimetry is within a range of 1.1 μm to 2.6 μm.

2. The nonaqueous electrolyte battery according to claim 1, wherein a thickness of the separator is within a range of 3 μm to 25 μm.

3. The nonaqueous electrolyte battery according to claim 1, wherein the electrical resistance of the negative electrode in the discharged state is within a range of 200 Ω·cm to 1000 Ω·cm.

4. The nonaqueous electrolyte battery according to claim 1, wherein:
    the negative electrode further comprises graphite as a conductive agent; and
    a value of AB/CD for the negative electrode falls within a range from 4 to 25, where A (m$^2$/g) is a specific surface area of the spinel-type lithium-titanium composite oxide, B is a weight content ratio of the spinel-type lithium-titanium composite oxide in the negative electrode, C (m$^2$/g) is a specific surface area of the graphite, and D is a weight content ratio of the graphite in the electrode.

5. A battery pack, comprising the nonaqueous electrolyte battery according to claim 1.

6. The battery pack according to claim 5, further comprising a protective circuit.

7. A battery pack, comprising a plurality of the nonaqueous electrolyte batteries according to claim 1, wherein the nonaqueous electrolyte batteries are electrically connected in series or in parallel, or in a combination of a series connection and a parallel connection.

* * * * *